UNITED STATES PATENT OFFICE.

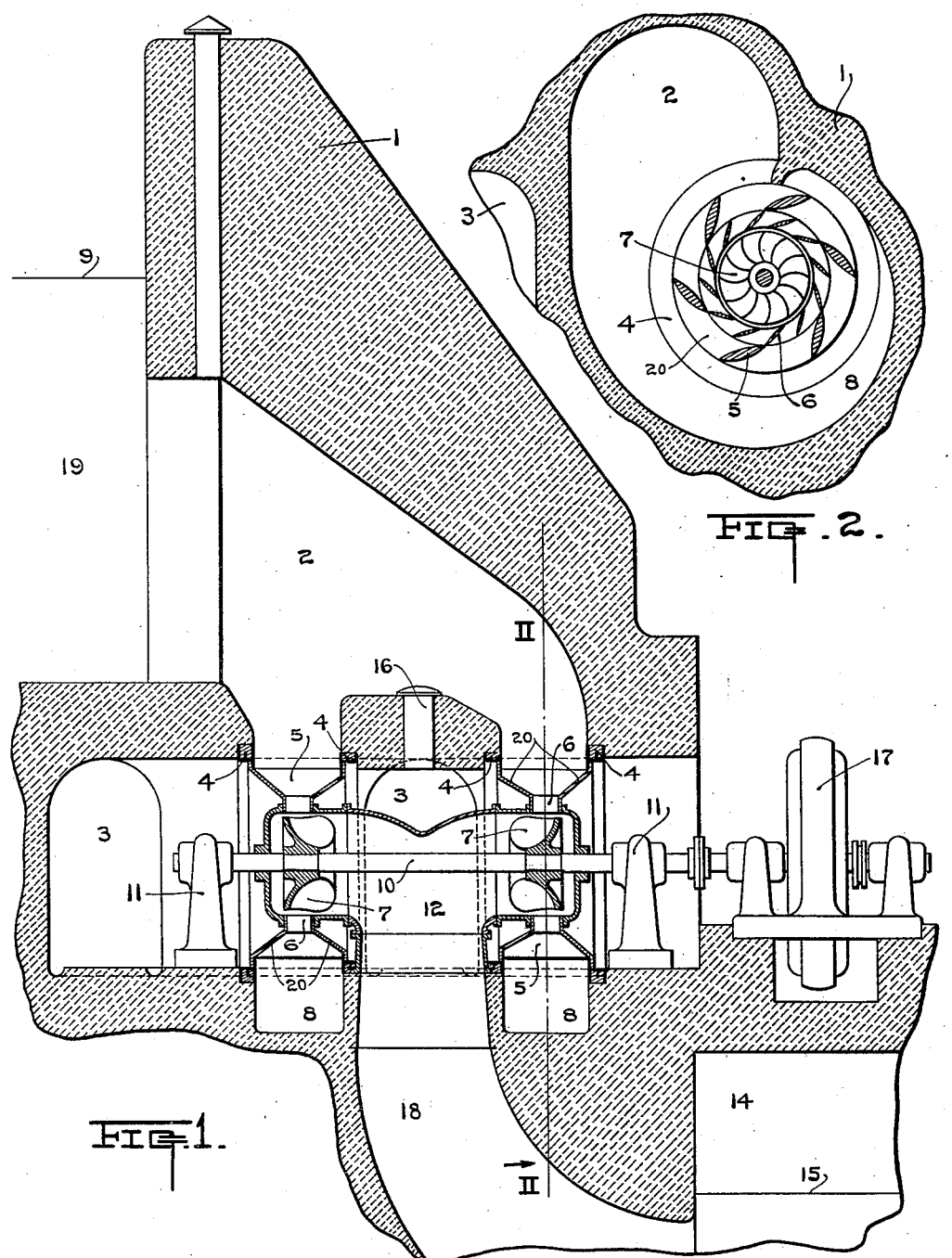

CHARLES O. TAPPAN, OF MILWAUKEE, WISCONSIN, ASSIGNOR TO ALLIS-CHALMERS COMPANY, OF MILWAUKEE, WISCONSIN, A CORPORATION OF NEW JERSEY.

HYDRAULIC-POWER PLANT.

1,018,278. Specification of Letters Patent. Patented Feb. 20, 1912.

Application filed January 13, 1911. Serial No. 602,387.

*To all whom it may concern:*

Be it known that I, CHARLES O. TAPPAN, a citizen of the United States, residing at Milwaukee, in the county of Milwaukee and State of Wisconsin, have invented a certain new and useful Improvement in Hydraulic-Power Plants, of which the following is a specification.

This invention relates to improvements in the construction of hydraulic turbine installations.

An object of the invention is to provide means for positioning the hydraulic turbine within a dam and to maintain accessibility to the various portions of the turbine.

Another object is to provide a construction of passages and casings within the dam structure which will be simple and durable in construction and provide for ready removability of parts.

A clear conception of one embodiment of the invention can be obtained by referring to the accompanying drawings in which like reference characters designate the same or similar parts in different views.

Figure 1 is a fragmentary transverse vertical section through a dam showing the installation of twin hydraulic turbines therein. Fig. 2 is a fragmentary vertical transverse section through one of the spiral chambers and turbines of the installation shown in Fig. 1, the section being taken along the line II—II, looking in the direction of the arrow.

The dam 1, which separates the forebay 19 from tail-race 14, is preferably constructed of concrete or similar material. The supply conduit or feeder 2 is formed within the dam 1 near one end thereof and connects with the forebay 19. The spiral chambers 8, of which there are two, connect with the feeder 2 and have their inner walls formed by the speed-gates 20, preferably formed of metal. These speed-gates 20 connect annularly with extensions of the discharge casings 12, said extensions projecting within the speed-gates and forming housings for the runners 7.
The turbine runners 7 are mounted upon the turbine shaft 10 which is supported in suitable bearings 11. The generator 17 is direct connected to the turbine shaft 10 and is adapted to be driven by the turbines. The speed-gates 20 have therein guide ribs 5 which are directed tangentially toward guide vanes 6 also tangentially directed toward the turbine runners 7. The guide vanes 6 are in the usual manner adapted to be shifted in order to close off communication from the spiral chambers 8, to the runners 7. The casing 12 connects with the draft tube 18 which in turn connects with the tail-race 14.

Passages 3 are formed within the dam 1 and lead to the bearings 11 of the turbines and also to the space surrounding the casing 12, thereby permitting accessibility to the space immediately adjacent the casing extensions and the guide vane operating mechanisms not shown. The manhole 16, which is normally closed, permits access to the feeder 2 from the passage 3. The flume rings 4, which by any convenient attachment means support the speed-gates 20, are secured to or set into the concrete wall of the dam 1.

The normal water level in the forebay 19 is represented by the line 9, while the line 15 represents the normal water level in the tail-race 14. In actual construction a gate is provided closing communication between the forebay 19 and the feeder 2, but this gate has been omitted since it forms no part of the present invention.

During the construction of the dam 1, the feeder passage 2, spiral chambers 8, passages 3, and draft-tube 18, are constructed by means of forms, the concrete being poured in direct contact with these forms. No lining whatever is used to face the various conduits and passages. The flume-rings 4, which are grouted into the concrete walls, are adapted for the fastening thereto of the speed-gates 20 which form a water-tight wall between the spiral chambers 8 and the passages 3. With the construction of the entire installation within the section of the dam 1, it will be noted that the use of external piping and connections resulting from placing the installation some distance from the dam, is avoided.

It is important to note that there is provided in the dam of this power plant, a hydraulic conduit in which the wheels proper of the turbine are located, and inspection passages separated from the hydraulic conduit, whereby adjustment can be made and attention be given to running parts.

It should be understood that it is not desired to be limited to the exact details of construction shown and described, for obvious modifications will occur to a person skilled in the art.

It is claimed and desired to secure by Letters Patent,—

1. In a hydraulic power plant, the combination of a dam having a hydraulic conduit formed directly therein, a speed-gate in said conduit, a wheel within said speed-gate, and inspection passages formed in said dam separate from but adjacent to said conduit, said passages leading to both sides of said wheel and speed-gate.

2. In a hydraulic power plant, the combination of a dam, a conduit formed directly in said dam, two parallel flume-rings fastened in the structure of said dam, a speed-gate fastened to said rings and through which said conduit passes, a wheel within said gate, and an inspection passage adjacent each of said flume rings.

3. In a hydraulic power plant, the combination of a dam, a feeder therein, a spiral chamber formed in said dam and connecting to said feeder, a speed-gate leading from said spiral chamber, a wheel within said speed-gate, a draft tube formed in said dam, and a casing surrounding said wheel and connecting to said speed-gate and said draft tube and spaced from the structure of said dam to form a plurality of inspection chambers one on each side of said speed-gate.

In testimony whereof, I affix my signature in the presence of two witnesses.

CHARLES O. TAPPAN.

Witnesses:
JOHN DAY, Jr.,
W. H. LIEBER.

---

Copies of this patent may be obtained for five cents each, by addressing the "Commissioner of Patents, Washington, D. C."